United States Patent [19]

Brandstetter et al.

[11] 4,423,187
[45] Dec. 27, 1983

[54] THERMOPLASTIC MOLDING MATERIALS

[75] Inventors: Franz Brandstetter, Neustadt; Adolf Echte, Ludwigshafen; Juergen Hambrecht, Neckargemuend-Dilsberg; Karl H. Illers, Otterstadt; Edmund Priebe, Frankenthal, all of Fed. Rep. of Germany

[73] Assignee: BASF Aktiengesellschaft, Ludwigshafen, Fed. Rep. of Germany

[21] Appl. No.: 356,067

[22] Filed: Mar. 8, 1982

[51] Int. Cl.³ .............................................. C08L 61/04
[52] U.S. Cl. ................................... 525/68; 525/289; 525/302; 525/905
[58] Field of Search ................................. 525/68, 905

[56] References Cited

U.S. PATENT DOCUMENTS 3,787,532  1/1974  Carmelite et al. .................. 525/68
3,830,878  8/1974  Kato et al. .......................... 525/80

FOREIGN PATENT DOCUMENTS 1260135  1/1965  Fed. Rep. of Germany .

*Primary Examiner*—J. Ziegler
*Attorney, Agent, or Firm*—Norbert M. Lisicki

[57] ABSTRACT

The invention relates to thermoplastic molding materials based on impact resistant polystyrene and polyphenylene ethers. The molding materials of this invention contain a flexible component having a glass temperature below $-70°$ C. and a flexible component having a glass temperature in the range of $0°$ to $-70°$ C.

3 Claims, No Drawings

THERMOPLASTIC MOLDING MATERIALS

BACKGROUND OF THE INVENTION

1. Field of the Invention

The invention relates to thermoplastic molding materials based on impact resistant polystyrene and polyphenylene ethers. More particularly, this invention relates to a thermoplastic molding material containing an impact resistant polystyrene and a polyphenylene ether wherein the impact resistant polystyrene is a mixture of an impact resistant polystyrene containing a flexible component having a glass temperature below −70° C. and an impact resistant polystyrene containing a flexible component having a glass temperature in the range of from 0° C. to 70° C.

2. Description of the Prior Art

Thermoplastic masses which are useful for the manufacture of molded parts and which contain impact resistant polystyrene and polyphenylene ethers are described in U.S. Pat. Nos. 3,383,435, 4,128,602 and 4,128,603. U.S. Pat. No. 4,167,507 and German Published Application No. 22 58 896 describe molding materials which also contain hydrogenated block copolymers of butadiene and styrene and/or diene rubber interpolymers for increasing the impact resistance.

Such molding materials are suited for the manufacture of molded parts which when compared with impact resistant polystyrene which are not mixed with polyphenylene ethers stand out by improved dimensional stability when exposed to heat. The material properties of such molding masses are generally satisfactory, but it has been shown that the notch impact resistance of these molding materials is not sufficient for a number of applications.

SUMMARY OF THE INVENTION

A purpose of this invention was to create thermoplastic molding materials based on impact resistant polystyrene and polyphenylene ethers having a more favorable notch impact resistance.

This invention relates to a molding material comprising (a) 5 to 95 parts by weight of an impact resistant polystyrene wherein
  (1) 5 to 95 parts by weight of the flexible component of the impact resistant polystyrene have a glass temperature below −70° C. and
  (2) 95 to 5 parts by weight of the flexible component of the impact resistant polystyrene have a glass temperature in the range of 0 to −70° C. and
(b) 95 to 5 parts by weight of a polyphenylene ether.

DESCRIPTION OF THE PREFERRED EMBODIMENTS

The molding materials of the invention contain component (a), an impact resistant polystyrene, and component (b), a polyphenylene ether.

Molding materials are unmolded mixtures processable into molded parts or semi-finished parts by thermoplastic processing at certain temperature ranges. The molding materials may be present in the form of granulates or powders, pellets, panels or sheets.

The impact resistant polystyrene of the molding materials of this invention is made by any suitable method such as bulk or solution polymerization described in U.S. Pat. No. 2,694,692 and bulk-suspension polymerization described in U.S. Pat. No. 2,862,906. Other processes may also be used such as emulsion polymerization.

Useful as the impact resistant polystyrene are monovinyl aromatic compounds such as styrene and nucleous or side chain alkylated styrenes. A maximum of up to 10 percent by weight of the monovinyl aromatic compound may be replaced by other comonomers such as acrylonitrile, maleic anhydride or methacrylic acid esters. Styrene is preferably used.

A rubber, i.e., natural or synthetic rubbers, is used for modifying styrene polymers to be impact resistant. The glass temperature should be less than 0° C., preferably less than −20° C. The determination of the glass temperature is done by the procedure of K. H. Illers, Kolloid-Zeitschrift [*Colloid Journal*], vol. 176, page 110, 1961. Useful as the rubber are impact resistance modifying materials including natural rubber, synthetic rubbers such as polybutadiene, polyisoprene and copolymers of butadiene and styrene or acrylonitrile; elastomers based on alkyl esters of acrylic acid with the alkyl radical containing 1 carbon atom to 8 carbon atoms; copolymers of alkyl esters of acrylic acid and butadiene, styrene, acrylonitrile and vinyl ethers; copolymers of ethylene-propylene and a diene component, ethylene-vinyl acetate copolymers and chlorinated polyethylene.

The impact resistant polymer of this invention is made by a polymerization process of the monovinyl aromatic compound in the presence of rubbers having varying glass temperatures. Preferably, two styrene polymers which are modified to be impact resistant having different glass temperatures are mixed. Component a of this invention is produced such as by combining a polystyrene based on butadiene and modified to be impact resistant and an impact resistant polystyrene, the flexible component of which is based upon an ester of acrylic acid. Advantageously the traditional impact resistant polystyrene is produced by polymerization of monovinyl aromatic compounds in the presence of the rubber. The polymerization generally takes place in a known way in bulk, solution or aqueous dispersion whereby the rubber is initially dissolved in the polymerizable monomer and then this starting solution is polymerized. In solution polymerization, up to a maximum of 50 percent by weight relative to the used monovinyl aromatic compounds of an inert dilution agent may be added to the starting solution. Inert diluting agents include for instance aromatic hydrocarbons or mixtures of aromatic hydrocarbons. Preferably used are toluene, ethyl benzene, the xylenes or mixtures of these compounds.

Solvents are generally not added for the polymerization in aqueous dispersion. According to a particularly advantageous version, the solution of the rubber is prepolymerized in bulk in the monomers until a conversion of approximately 45 percent is achieved by the use of shear forces. This reaction mass is then suspended in water and is subsequently completely polymerized. Generally this process is triggered by adding oil soluble initiators which decompose into radicals such as benzoyl peroxide, dicumyl peroxide, di-tertiary butyl peroxide, azo-diisobutyronitrile and similar substances or combinations thereof, but the prepolymerization may also be started by thermal means. Known suspension agents are water soluble, high molecular compounds such as methylcellulose, oxypropylcellulose, polyvinyl alcohol, partially saponified polyvinylacetates, or inorganic dispersion agents such as barium sulfate. The suspension agents are generally used in quantities of 0.1 to 5 percent by weight relative to the organic phase. Polymerization in bulk or in solution is generally carried out in a temperature range from 50° C. to 250° C., preferably 100° C. to 200° C. At least during the first part of the polymerization, that is, until about equal to or less than 45 percent of the monovinyl aromatic compounds have reacted, the polymerization mixture must be stirred well. All of these polymerization processes are known and are described in detail in the literature. A summarizing description was written by Amos, Polymer Engineering Science, vol. 14 (1974), 1, page 1 through 11, and in U.S. Pat. Nos. 2,694,692 and 2,862,806 to which reference is made for further details.

The term "flexible component" used herein is understood to be that part of the impact resistant polymer which is insoluble in toluene at room temperature (25° C.) minus any pigments. The flexible component thus corresponds with the gel component of the product.

The flexible component generally has a heterogeneous structure. As a rule, it forms in the course of the manufacturing process and the quantity and degree of dispersion are influenced by the process conditions. It is known that the solution of the rubber which is to be polymerized in the monovinyl aromatic monomer separates immediately after the start-up of the reaction into two phases of which one phase, a solution of the rubber in the monomeric vinyl aromatic, initially forms the coherent phase whereas the second phase is a solution of the polyvinyl aromatic in its own monomer which polyvinyl aromatic remains suspended in the monomer in the form of droplets. With increasing conversion, the amount of the second phase increases as the first consumes the monomer. During this process, a change of the phase coherence occurs. Thereupon, drops of rubber solution form in the polyvinyl aromatic solution. These drops, in turn, include smaller drops of the phase which is now the external phase.

In addition to this process, a grafting reaction takes place where chemical bonds are formed between the rubber molecules and the polyvinyl aromatics accompanied by the formation of graft-copolymers of both components. This process is described in Fischer, Die angew. Makrom. Chem. [*Applied Macromolecular Chemistry*], vol. 33 (1973), pages 35 through 74.

The grafted as well as the physically enclosed part of the polyvinyl aromatic in the rubber particles must be considered part of the flexible component.

When the mass is totally polymerized, a heterogeneous flexible component has been produced which is incorporated in a hard matrix of the polyvinyl aromatic. This flexible component consists of grafted rubber particles with inclusions of matrix material (polyvinyl aromatic). The greater the amount of the enclosed matrix material, the greater is the amount of flexible component with constant rubber content.

The amount of flexible component thus is not only a function of the amount of the rubber used but also is a function of the process control, particularly prior to and during the phase inversion. The individual measures are process specific and are known to the expert, as disclosed, for instance in Freeguard, British Polymer Journal 6 (1974), pages 203 to 228; Wagner, Robeson, Rubber Chem. Techn. 43 (1970), pages 1129 ff.

In order to produce the impact resistant thermoplastic molding materials of this invention, the amount of rubber, which is dissolved in the monomer producing the starting solution prior to the polymerization, is chosen as a function of the final conversion of the polymerization such that the flexible component content and the resultant polymer of the impact resistant monovinyl aromatic compounds represent at least 20 percent by weight, preferably 25 percent by weight and more, relative to the polymer modified to be impact resistant. The upper limit of the flexible component content is set at 50 to 60 percent by weight by the requirement that the polyvinyl aromatic must form the coherent phase. For the thermoplastic molding materials of this invention, a flexible component content of 25 to 35 percent by weight relative to the impact resistant polymer is preferred. The rubber component of the impact resistant polymer is generally between 2 and 20 percent by weight, preferably 5 to 15 percent by weight.

The polymers of the impact resistant monovinyl aromatic compounds contain a uniform enveloping matrix of the polymer and the monovinyl aromatic compound into which is embedded the rubber particles of the flexible component as disperse phase. The rubber particles are partially cross-linked and grafted by the monovinyl aromatic compounds during the polymerization process.

The determination of the average particle size of the disperse flexible component may be done by counting and evaluating thin layer electron microscopies of the impact resistant polymers (compare F. Lenz, *Journal of Scientific Microscopie* [Zeitschrift für Wiss. Mikroskopie], vol. 63 (1956), page 50/56).

The particle size of the disperse flexible component phase is adjusted in a known manner during the polymerization of the monovinyl aromatic compounds by adjusting the agitating velocity during the first section of the polymerization, that is, up to a conversion of the monomers of equal to or less than 45 percent. When the particle size of the disperse flexible component phase is the greater, the smaller is the agitator speed and thus the smaller the shear stress is. The inter-relationship between the agitator speed and the size and distribution of the rubber particles in the resultant impact resistant polymer is described in the cited work by Freeguard to which reference is made concerning additional details. The respective necessary agitating speed to achieve the desired particle size of the disperse flexible component phase is, among other things, a function of the respective equipment conditions and is known to the expert and can be determined by a few simple tests.

The average particle size (weight average) of the disperse flexible component phase was determined by counting and averaging the number of particles which are part of the same size class (constant inter-wall width) from thin layer electronmicroscopies. With the volumina of the particles (third power of the apparent diameter) within the intervals the distribution sum curve is determined. With a 50 percent ordinate value, the equivalent diameter can then be picked out on the abscissa. The listed average diameters represent an average value of at least 5000 particles.

The impact resistant polystyrene which contains a polymer of acrylic acid as rubber component is advantageously produced in emulsion. The polymerization of the monovinyl aromatic compounds is carried out separately in bulk, solution, suspension or aqueous emulsion. The resistant rigid component preferably should have a viscosity number of 40 to 140, particularly 80 to 120 ml/gram. The viscosity number is determined according to DIN 53 726 at 25° C. For this purpose, 0.5 gram of material is dissolved in 100 ml of toluene.

In this case the flexible component is manufactured in two stages. Initially a cross-linked acrylate polymer is produced to which the styrene for the manufacture of the copolymerized graft polymer mixture is grafted in the second stage.

The manufacture of the copolymerized graft polymer mixture is done by known methods. A cross-linked acrylate polymer having a glass transition temperature below 0° C. serves as a grafting base. The cross-linked acrylate polymer should preferably have a glass temperature below −20° C., more preferably below −30° C.

In order to obtain cross-linked acrylate polymers as grafting bases for the manufacture of the copolymerized graft polymer mixture, the polymerization of the acrylate is preferably carried out in the presence of 0.5 to 10 percent by weight, preferably 1 to 5 percent by weight relative to the total amount of monomers used in the manufacture of the grafting bases of a copolymerizable multifunctional, preferably bifunctional, monomer which brings about the cross-linking. Suitable as such bi- or multifunctional cross-linking monomers are monomers which preferably contain two, or more, ethylenic double bonds which are capable of copolymerizing and which are not conjugated in the 1,3-positions. Suitable cross-linking monomers include for instance divinylbenzene, diallylmaleate, diallylfumarate or diallylphthalate. The acrylic ester of tricyclodecenyl alcohol has proven to be a particularly favorable cross-linking monomer as described in German Pat. No. 12 60 135. The cross-linking monomer may contain comonomers.

The grafting base is made in an emulsion. A latex is initially produced in which the acrylate and the multifunctional cross-linking monomer are polymerized in aqueous emulsion in a known manner at temperatures between 20° C. and 100° C., preferably between 50° C. and 80° C. Normally used emulsifiers such as alkali salts or alkyl- or alkylarylsulfonic acids, alkylsulfates, fatty alcohol sulfonates, salts of higher fatty acids with 10 to 30 carbon atoms and resin soaps may be used. Preferably used are the sodium salts of alkylsulfonates or fatty acids with 10 to 18 carbon atoms. It is advantageous to use the emulsifiers in quantities of 0.1 to 5 percent by weight, particularly of 0.5 to 2 percent by weight relative to the monomers used in the manufacture of the grafting base. Generally, a water to monomer ratio of 2:1 to 0.7:1 is used. Useful polymerization initiators are persulfates such as potassium persulfate. Redox systems may also be used. Generally, the initiators are used in quantities of 0.1 to 1 percent by weight relative to the monomers used in the manufacture of the grafting base. Additionally polymerization auxiliaries are the commonly used buffer substances by which pH values are adjusted to preferably 6 to 9. These include, for instance, sodium bicarbonate and sodium pyrophosphate as well as 0 to 5 percent by weight of a molecular weight regulator such as mercaptan, terpene or dimeric α-methylstyrene. The accurate polymerization conditions, particular type metering and quantity of the emulsifier are determined individually within the abovementioned ranges so that the resultant latex of the cross-linked acrylate polymer has a $d_{50}$ value in the range of approximately 0.05 to 0.15 micron, preferably in the range of 0.06 to 0.12 micron.

In order to manufacture the copolymerized graft polymer mixture, the sytrene is then polymerized in a second step in the presence of the latex of the acrylate polymer obtained in accordance with the procedure described above. It is advantageous to carry out this copolymerization of mixed graft polymers of styrene to the acrylate polymer which serves as a grafting base in an aqueous emulsion under the commonly used above-referenced conditions. The copolymerization of the mixed graft polymers can appropriately take place in the same system as the emulsion polymerization for the manufacture of the grafting base. If necessary, additional emulsifier and initiator can be added. The styrene to be grafted and any comonomers can be added to the reaction mixture at once in batches or, preferably, during the polymerization. The graft copolymerization of styrene and any comonomers in the presence of the cross-linked acrylate polymer is controlled in such a manner that a grafting degree of 10 to 60 percent by weight, preferably 30 to 40 percent by weight, results in the copolymerized graft polymer mixture. Since the grafting yield of this grafting copolymerization is not 100 percent, a somewhat larger quantity of styrene and possibly comonomers must be used for the process than would correspond with the desired degree of grafting. The control of the grafting yield during the polymerization and thus the grafting degree of the finished copolymerized graft polymer mixture is known and may be implemented by the metering rate of the monomers or by adding regulators (Chauvel, Daniel, ACS Polymer Preprints 15 (1974), page 329 ff). The emulsion copolymerization of grafting mixtures generally results in approximately 5 to 15 percent by weight of free ungrafted styrene polymer or styrene copolymer relative to the copolymerized graft polymer mixture.

Depending upon the conditions selected for the manufacture of the copolymerized graft polymer mixtures, enough rigid component is formed during the copolymerization of the graft polymer mixtures. Generally, however, it will be necessary to mix the products resulting from the copolymerization of the graft polymer mixtures with additional separately produced rigid components.

The polyphenylene ethers, Component b, are compounds based on polyphenyleneoxides, disubstituted in the ortho position, whereby the ether oxygen of one unit is bonded to the benzene nucleous of the adjacent unit. At least 50 units are bonded to each other. The polyethers may have in ortho position to the oxygen, hydrogen, halogen, hydrocarbons which do not have any tertiary position hydrogen atoms, halogenated hydrocarbons, phenyl radicals and hydrocarbon-oxy-radicals. Useful are the following compounds: poly(2,6-dichloro-1,4-phenylene)-ether, poly(2,6-diphenyl-1,4-phenylene)-ether, poly(2,6-dimethoxy-1,4-phenylene)-ether, poly(2,6-dimethyl-1,4-phenylene)ether, poly(2,6-dibromo-1,4-phenylene)ether. Preferably used is poly(2,6-dimethyl-1,4-phenylene)ether. More preferred is poly(2,6-dimethyl-1,4-phenylene)ether with a viscosity limit between 0.45 and 0.65 dl/gram (measured in chloroform at 30° C.).

The polyphenylene ethers may be produced from phenols for instance in the presence of complex building materials such as copper bromide and secondary dibutylamine.

Mixtures of the impact resistant polystyrene and polyphenylene ethers may also contain additional additives such as pigments, dyestuffs, fillers, flame retardants, additional compatible polymers, antistatics, antioxidants and lubricants.

By mixing Components a and b, the thermoplastic molding materials of this invention are obtained. This is accomplished by using equipment permitting homogeneous mixing such as meters, extruders or roller mixers.

In addition to the high dimensional stability when exposed to heat, good surface characteristics and generally good mechanical properties, the molding materials of this invention display a surprisingly high notch impact strength.

The invention is further explained by a series of examples and comparison tests which follow below.

The parts referred to in the examples and comparison tests are parts by weight.

EXAMPLES AND COMPARISON TESTS

Component al of Examples 1 and 2 and Comparison Examples A and D

A polystyrene modified to be impact resistant having a flexible component, the glass temperature of which is −100° C., is obtained in the following manner:

In a 2-vessel-2-tower cascade a mixture of 7.2 parts of a polybutadiene having a cis-component of 98 percent together with 85.7 parts of styrene, 6 parts of ethyl benzene and 0.1 part of octadecyl-3-(3′, 5′-ditertiary-butyl-4′-hydroxyphenyl)-propionate are thermally polymerized. The throughput was 4 liters/hour. The agitator speeds used in the individual reactors, temperatures as well as the set integral conversions are listed below. In the third reactor 0.02 percent by weight of tertiary dodecyl mercaptane, relative to styrene, are continuously metered into the polymer stream. Solvent and residual monomers are removed from the polymer mixture following the polymerization in a degassing zone at 200° to 240° C. The average particle size was approximately 1 micron.

| Location | Stirring Rate rpm | Temperature °C. | Reaction (Integral) |
|---|---|---|---|
| 1. Agitator Reactor | 100 | 104 | 3.8 |
| 2. Agitator Reactor | 160 | 132 | 20.3 |
| 1. Tower | 15 | 101 | 55.3 |
| 2. Tower | 3 | 127 | 84.3 |
| Degassing | — | 250 | — |

Component al of Examples 3 and 4 and Comparison Example B

A polystyrene modified to be impact resistant having a flexible component the glass temperature of which is −74° C. is produced in the following manner:

A solution consisting of
1283 grams styrene
112 grams polybutadiene (1,2-vinyl content approximately 9 percent by weight)
1.5 grams t-dodecylmercaptane
1.5 grams octadecyl-3(3′,5′-di-tertiary-butyl-4′-hydroxyphenyl)-propionate
1.5 grams dicumylperoxide
was prepolymerized in a 4 liter agitator vessel with paddle agitator, an internal temperature of 110° C. and an agitator speed of 150 rpm until a solids content of 25.4 percent by weight was achieved. Subsequently, 1800 ml of water containing 9 grams of polyvinylpyrrolidone with a K-value of 90 and 1.8 grams of $Na_4P_2O_7$ were added and the agitator speed was increased to 300 rpm. By postpolymerization of 3 hours at 110° C., 3 hours at 120° C. and 4 hours at 140° C., the mixture was polymerized until a styrene conversion of 99 percent was achieved. The average particle size was approximately 6 microns.

Component al of Example 5 and Comparison Examples C and E

A corresponding polystyrene modified to be impact resistant and having a flexible component the glass temperature of which is −75° C. and the average particle size of which is approximately 0.5 micron is obtained in the following manner:

A solution consisting of
1560 grams styrene
240 grams Bu/S-block copolymer with a smeared transition between the blocks:
[n]=1.74 [dl/g]
(toluene 25°); block polystyrene=31.0 percent;
[n]=0.364 [dl/g] (toluene 25°); total styrene content=41.6 percent
1.6 grams t-dodecylmercaptan
2.2 grams octadecyl-3(3′, 5′-ditertiary-butyl-4-hydroxyphenyl)-propionate
1.7 grams dicumylperoxide in a 5 liter agitator vessel with paddle agitator was prepolymerized at 110° C. internal temperature at an agitator speed of 150 rpm until a solids content of 43.8 percent by weight was reached.

Following this process, 1800 ml water containing 9.0 grams polyvinylpyrrolidone having a K-value of 90 and 1.8 grams of $Na_4P_2O_7$ were added and the agitator speed was increased to 300 rpm. After polymerization for 5 hours at 120° C. and 5 hours at 140° C., the mixture was polymerized until a styrene conversion of 99 percent was achieved.

Component a2 of Examples 1–5

A modified impact resistant polystyrene having a glass temperature of the flexible component of −45° C. is obtained as follows:

98 parts of butylester of acrylate and 2 parts tricyclodecenylacrylate are polymerized in 154 parts of water adding 2 parts of dioctylsulfosuccinate sodium (70 percent) as emulsifier and 0.5 parts potassium persulfate while being stirred at 65° C. for 3 hours. An approximately 40 percent disperson is obtained. The average particle size of the latex is approximately 0.1 micron.

665 parts of styrene in the presence of 2500 parts of a stock polymer latex at the above-mentioned composition and an average particle size of 0.1 microns, 2 parts of potassium persulfate, 1.33 parts lauroyl peroxide and 1005 parts water are polymerized at 60° C. while being stirred. A 40 percent dispersion is obtained from which the solid product is precipitated by adding a 0.5 percent calcium chloride solution and washing with water and drying.

For comparison tests D and E, a modified impact resistant polystyrene which was produced in accordance with method A of German Published Application No. 22 58 896 was used as component a2.

The amounts of component a and poly(2,6-dimethyl-1,4-phenylene)ether (component b) listed in the tables, 0.8 parts of trisnonylphenylphosphite and 1.5 parts of polyethylene were melted at 280° C. in a two-shaft extruder, homogenized, mixed and granulated. The poly(2,6-dimethyl-1,4-phenylene)ether had a marginal viscosity of 0.62 dl/gram (measured in chloroform at 30° C.). The following table shows the results of tests done on Examples 1-5 of the invention and Comparison Examples A-E.

| Examples | 1 | 2 | 3 | 4 | 5 |
|---|---|---|---|---|---|
| Component a |  |  |  |  |  |
| Component a1 |  |  |  |  |  |
| Glass Temperature, °C. | −100 | −100 | −74* | −74* | −75** |
| Parts by weight | 49.5 | 27.5 | 49.5 | 27.5 | 27.5 |
| Component a2 |  |  |  |  |  |
| Glass Temperature °C. | −45 | −45 | −45 | −45 | −45 |
| Parts by weight | 5.5 | 27.5 | 5.5 | 27.5 | 27.5 |
| Component b |  |  |  |  |  |
| parts by weight | 45 | 45 | 45 | 45 | 45 |
| Softening Point According to Vicat °C. | 134 | 130 | 134 | 130 | 131 |
| Notch Impact Resistance [KJ/m²] | 11.6 | 32.8 | 10.2 | 29.7 | 30.4 |

| Comparison Examples | A | B | C | D | E |
|---|---|---|---|---|---|
| Component a |  |  |  |  |  |
| Component a1 |  |  |  |  |  |
| Glass Temperature °C. | −100 | −74* | −75** | −100 | −75** |
| Parts by weight | 55 | 55 | 55 | 49.5 | 27.5 |
| Component a2 |  |  |  |  |  |
| Glass Temperature °C. | — | — | — | −85 | −85 |
| Parts by weight | 0 | 0 | 0 | 5.5 | 27.5 |
| Component a2 |  |  |  |  |  |
| Glass Temperature °C. | — | — | — | −85 | −85 |
| Parts by weight | 0 | 0 | 0 | 5.5 | 27.5 |
| Component b |  |  |  |  |  |
| parts by weight | 45 | 45 | 45 | 45 | 45 |
| Softening Point According to Vicat °C. | 135 | 134 | 132 | 134 | 129 |
| Notch Impact Resistance [KJ/m²] | 7.2 | 3.6 | 7.3 | 6.9 | 9.0 |

*average size of the flexible component 6 microns
**average size of the flexible component 0.5 microns The embodiments of the invention in which an exclusive privilege or property is claimed are defined as follows:

1. A thermoplastic molding material based on an impact resistant polystyrene and a polyphenylene ether comprising
    (a) 5 to 95 parts by weight of an impact resistant polymer consisting of styrene alone or styrene and up to 10 percent by weight of acrylonitrile, maleic anhydride or methacrylic acid esters wherein
        (1) 5 to 95 parts by weight of a flexible component of the impact resistant polymer consisting of a graft polymer of styrene and a compound selected from the group consisting of polybutadiene and styrene butadiene block copolymer have a glass temperature below −70° C. and
        (2) 95 to 5 parts by weight of a flexible component of the impact resistant polymer, containing a polymer of acrylic acid ester as the rubber component made by grafting styrene to a crosslinked acrylate polymer have a glass temperature in the range from 0° to −70° C. and
    (b) 95 to 50 parts by weight of a polyphenylene ether.

2. The thermoplastic molding material of claim 1 wherein the polymer of acrylic acid ester is a polymer containing 98 parts butylester of acrylic acid and 2 parts tricyclodecenylacrylate.

3. The thermoplastic molding material of claim 1 containing about 27.5 percent by weight component (a1) having a glass temperature below −70° C., about 27.5 percent by weight component (a2) having a glass temperature of about −45° C. and about 45 percent by weight of poly(2,6-dimethyl-1,4-phenylene)ether as component b.

* * * * *

UNITED STATES PATENT AND TRADEMARK OFFICE
CERTIFICATE OF CORRECTION

PATENT NO. : 4,423,187
DATED : December 27, 1983
INVENTOR(S) : Franz Brandstetter et al It is certified that error appears in the above-identified patent and that said Letters Patent is hereby corrected as shown below:

On the title page Insert

Foreign Application Priority Data

--March 6, 1981 (DE) Fed. Rep. of Germany 3108424--.

Signed and Sealed this

Fifth Day of June 1984

[SEAL]

Attest:

GERALD J. MOSSINGHOFF

Attesting Officer          Commissioner of Patents and Trademarks